May 3, 1938.  N. W. FOSTER  2,116,195
FLEXIBLE COUPLING
Filed July 8, 1937
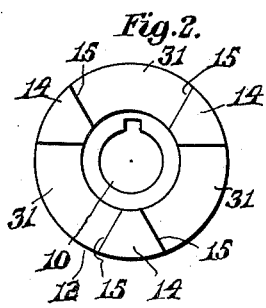
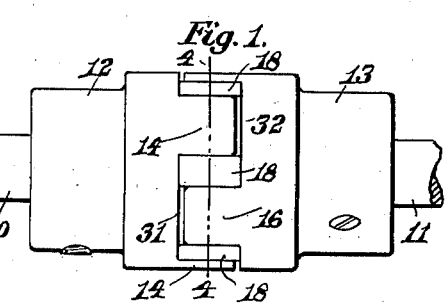
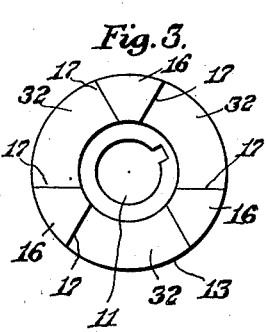
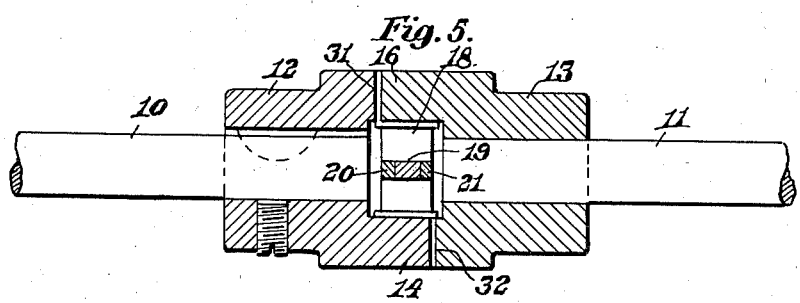
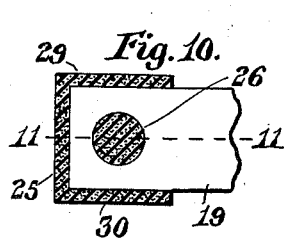
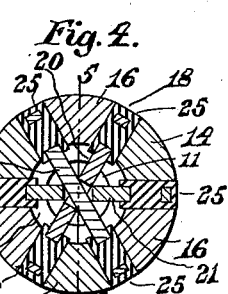
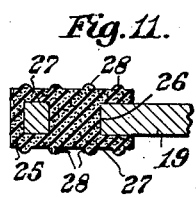
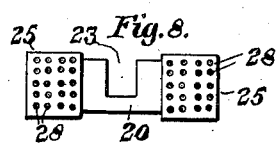
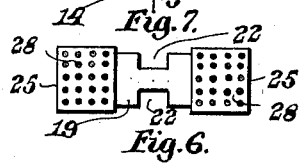
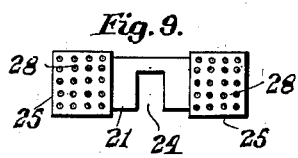
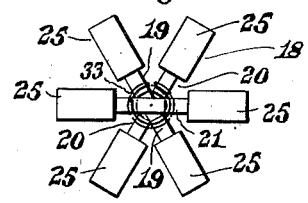
Inventor:
Neal W. Foster,
by Walter E. Lombard,
Atty.

Patented May 3, 1938

2,116,195

UNITED STATES PATENT OFFICE 2,116,195

FLEXIBLE COUPLING

Neal W. Foster, Wollaston, Mass., assignor to Boston Gear Works, Inc., North Quincy, Mass., a corporation of Massachusetts Application July 8, 1937, Serial No. 152,605

4 Claims. (Cl. 64—14)

This invention relates to flexible couplings for connecting two substantially alined revoluble shafts, the object of the invention being to obtain a more flexible connection between the coupling members secured to said shafts by providing the end of each arm of the power-transmitting member with a cap of resilient material bearing against flat bearing faces of two lugs projecting from opposed faces of said coupling members.

Another object of the invention is the provision of a power-transmitting member made up of a plurality of interlocked flat plates.

A further object of the invention is the provision of means preventing the displacement of said caps from the rigid arms of the transmitting member.

These objects are attained by the mechanism illustrated in the accompanying drawing.

For the purpose of illustrating the invention, one preferred form thereof is illustrated in the drawing, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawing:

Figure 1 represents an elevation of a coupling member embodying the principles of the present invention.

Figure 2 represents an end view of one of the coupling members thereof.

Figure 3 represents an end view of the other coupling member.

Figure 4 represents a transverse section of said coupling member, the cutting plane being on line 4, 4 on Fig. 1.

Figure 5 represents a longitudinal section of the coupling, the cutting plane being on line 5, 5 on Fig. 4.

Figure 6 represents the power transmitting member for said coupling.

Figures 7, 8, and 9 represent notched elements adapted to be interlocked to form said power transmitting member.

Figure 10 represents an enlarged section of one of said elements, and

Figure 11 represents a section of the same on line 11, 11 on Fig. 10.

Similar characters indicate like parts throughout the several figures of the drawing.

In the drawing, 10, 11 are two substantially alined revoluble shafts, the shaft 10 having secured thereto and revoluble therewith a coupling member 12, while the shaft 11 has a similar coupling member 13 secured thereto and revoluble therewith.

The coupling member 12 has formed thereon projecting lugs 14, the side bearing faces 15 of which are flat and preferably of soft metal.

The coupling member 13 has similar projecting lugs 16, the side faces 17 of which are flat and preferably of soft metal.

These flat bearing faces 15 and 17 of the lugs 14 and 16 are parallel for their entire length to each other and to a plane midway between them and radial to one of said shafts.

When the coupling is in use the projecting lugs 14 and 16 of the coupling members 12 and 13 extend toward each other as shown in Figs. 1 and 5, the lugs 14 of the coupling member 12 being interposed between the lugs 16 of the coupling member 13.

Between the coupling members 12 and 13 is interposed a power-transmitting member 18.

This member 18 is composed of rigid flat metal plates 19, 20, and 21.

The plates 19, 20, and 21 are so constructed that they will interlock and form a rigid member 18 having a plurality of radial arms the ends of which extend between and are equally distant from the flat bearing faces 15 and 17 of the lugs 14 and 16.

The flat metal plate 19 has midway of its length oppositely disposed notches 22 in the edges thereof while the plate 20 has a long notch 23 in one edge thereof, and the other plate 21 has a long notch in the opposite edge thereof.

When these plates are assembled in interlocked position as shown in Fig. 6, a very rigid power-transmitting member is obtained, the plates 19, 20, and 21 having no movement relatively to each other.

The thickness of the plates 19, 20, and 21 is considerably less than the width of the spaces between the adjacent lugs 14, 16, on the coupling members 12 and 13.

It is desirable to have resilient material in contact with the bearing faces 15 and 17, and therefore the ends of the plates 19, 20, and 21 are enclosed in caps 25 of resilient material.

At each end of each plate 19, 20, and 21 is a hole 26 extending therethrough and the resilient caps 25 are molded on the plates 19, 20, and 21 prior to the interlocking of said plates.

In the molding of these caps 25 on the plates 19, 20, and 21, the resilient material will flow through the holes 26 and unite the opposed sheets 27 of resilient material as indicated in Fig. 11.

By having portions of the resilient material extend through the holes 26, the caps 25 are permanently retained in place and cannot be displaced therefrom.

The outer faces of the sheets 27 of resilient material preferably have raised portions 28 thereon to provide a gripping surface to contact with the faces 15, 17.

The combined thickness of the sheets 27 and of the plates 19, 20, and 21, is sufficient to fill the spaces between the lugs 14 and 16.

The power-transmitting member 18 including the caps 25 has a thickness greater than the length of the projecting lugs 14, 16, and the opposite end faces 29, 30 of the caps 25 contact with the opposed faces 31, 32 on the coupling members 12 and 13, thus keeping the coupling members separated under all conditions.

When the plates 19, 20, and 21 have been assembled they are spun-riveted together as indicated at 33 in Fig. 6, and this prevents any separation thereof.

The coupling members 12 and 13, however, may be moved slightly toward each other owing to the resiliency of the end faces 29, 30, of the caps 25.

When the coupling members 12, 13 are moved into a position at an angle to each other, the end faces 29, 30 will be compressed to permit such movement.

The coupling constructed in the manner described permits the coupling members 12, 13 to be moved slightly toward each other and one of the supporting shafts 10 or 11 may be moved at an angle to the other without affecting the transmission of power from one shaft to the other.

The caps 25 are of insulating material and consequently the entire coupling forms an insulation between the two shafts.

The coupling is inexpensive to manufacture, has great wearing qualities, is easily assembled, and has a great degree of flexibility.

It is believed that the operation and many advantages of the invention will be understood readily without further description.

Having thus described my invention, I claim:

1. A coupling for connecting two substantially alined rotatable shafts consisting of a coupling member secured to each shaft, each coupling member having projecting lugs intermeshing with similar lugs on the other coupling member, said lugs having flat bearing faces lying parallel to a plane midway between them and radial to one of said shafts, a rigid power transmitting member mounted between said members and having rigid arms radiating from the center thereof, and resilient members on the opposite faces of the ends of said arms contacting with adjacent flat faces of two of said lugs of opposite coupling members.

2. A coupling as set forth in claim 1, in which the resilient members are caps enclosing the ends of said arms and immovably mounted thereon.

3. A coupling as set forth in claim 1, in which the power-transmitting member is composed of three interlocked metal plates, one plate having oppositely disposed notches in the edges thereof and the other plates having side notches only, all of said notches being midway of the length of said plates.

4. A coupling as set forth in claim 1, in which the power-transmitting member is composed of three interlocked metal plates spun-riveted together.

NEAL W. FOSTER.